United States Patent
Maestle et al.

(10) Patent No.: US 6,792,193 B2
(45) Date of Patent: Sep. 14, 2004

(54) RETURN LOSS REDUCTION

(75) Inventors: Ruediger Maestle, Boblingen (DE); Martin Guenther, Wildberg (DE); Bernd Maisenbacher, Schoemberg (DE)

(73) Assignee: Agilent Technologies, Inc., Palo Alto, CA (US)

(*) Notice: Subject to any disclaimer, the term of this patent is extended or adjusted under 35 U.S.C. 154(b) by 59 days.

(21) Appl. No.: 10/285,220

(22) Filed: Oct. 31, 2002

(65) Prior Publication Data

US 2003/0228086 A1 Dec. 11, 2003

(30) Foreign Application Priority Data

Jun. 11, 2002 (EP) .......................... 02012862

(51) Int. Cl.$^7$ .................................. G02B 6/42
(52) U.S. Cl. .................. 385/140; 385/33; 385/34; 385/35; 385/36; 385/37; 385/38; 385/39; 385/88; 385/89; 385/90; 385/91; 385/92; 385/93; 385/94; 372/36
(58) Field of Search ................ 385/33–39, 88–94, 385/140; 372/36

(56) References Cited

U.S. PATENT DOCUMENTS

| | | | | |
|---|---|---|---|---|
| 4,560,246 A | * | 12/1985 | Cotter ........................ | 385/27 |
| 5,125,053 A | * | 6/1992 | Abe et al. .................... | 385/36 |
| 5,276,747 A | * | 1/1994 | Pan ............................ | 385/34 |
| 5,388,171 A | * | 2/1995 | Michikoshi et al. ......... | 385/36 |
| 5,546,212 A | * | 8/1996 | Kunikane et al. ........... | 398/136 |
| 5,557,692 A | * | 9/1996 | Pan et al. .................... | 385/11 |
| 5,559,920 A | * | 9/1996 | Chraplyvy et al. .......... | 385/123 |
| 5,727,109 A | * | 3/1998 | Pan et al. .................... | 385/140 |
| 5,734,762 A | * | 3/1998 | Ho et al. ..................... | 385/11 |
| 5,875,271 A | * | 2/1999 | Laughlin ..................... | 385/16 |
| 5,940,564 A | * | 8/1999 | Jewell ........................ | 385/93 |
| 6,137,941 A | * | 10/2000 | Robinson .................... | 385/140 |
| 6,195,479 B1 | * | 2/2001 | Pan ............................ | 385/18 |
| 6,243,508 B1 | * | 6/2001 | Jewell et al. ................ | 385/14 |
| 6,304,709 B1 | * | 10/2001 | Fujita ......................... | 385/140 |
| 6,328,484 B1 | * | 12/2001 | Uebbing ..................... | 385/93 |
| 6,389,188 B1 | * | 5/2002 | Scobey et al. .............. | 385/18 |
| 6,421,474 B2 | * | 7/2002 | Jewell et al. ................ | 385/14 |
| 6,430,337 B1 | * | 8/2002 | Bergmann et al. .......... | 385/25 |
| 6,433,924 B1 | * | 8/2002 | Sommer ..................... | 359/337.1 |
| 6,433,942 B1 | * | 8/2002 | Memezawa et al. ........ | 359/833 |
| 6,529,535 B2 | * | 3/2003 | Katayama et al. .......... | 372/36 |
| 6,530,698 B1 | * | 3/2003 | Kuhara et al. .............. | 385/88 |
| 6,542,672 B2 | * | 4/2003 | Jewell et al. ................ | 385/49 |
| 6,603,584 B1 | * | 8/2003 | Jokerst et al. .............. | 398/135 |
| 6,614,958 B1 | * | 9/2003 | Schmidt ..................... | 385/33 |
| 6,632,030 B2 | * | 10/2003 | Jiang et al. ................. | 385/93 |
| 6,694,074 B2 | * | 2/2004 | Schunk ....................... | 385/33 |

FOREIGN PATENT DOCUMENTS

| | | | |
|---|---|---|---|
| EP | 0 595 449 | 4/1994 | |
| EP | 595449 A1 | * 5/1994 | ............ G02B/6/42 |

OTHER PUBLICATIONS

Verdrager, V., Examiner. European Search Report EP 02 01 2682 dated Aug. 29, 2002.

* cited by examiner

*Primary Examiner*—John R. Lee
*Assistant Examiner*—David A. Vanore

(57) ABSTRACT

The invention relates to an optical device comprising an emitting source and a partly-reflective element which is adapted for receiving an emitted light beam. This element is tilted in a small angle with respect to the emitted light beam. A portion of the emitted light beam is reflected by the partly-reflective element towards a transmittive element which is arranged in close proximity to the emitting source and adapted to receive and transmit the reflect portion. The transmittive element is arranged for at least partly fixing or positioning an optical fiber, which is emitting the input light beam, and provided for transmitting the laterally offset reflected portion of the input light beam away from the input fiber.

11 Claims, 2 Drawing Sheets

RETURN LOSS REDUCTION

BACKGROUND OF THE INVENTION

The invention relates to return loss reduction for optical devices.

Optical devices often provide a certain amount of back reflection towards a source of an incident beam thus leading to so-called return loss usually defined as the ratio of the back reflected to the incident beam power. Optical attenuators, as a typical optical device, are used for attenuating the intensity of a light beam e.g. emerging from an optical fiber or an optical source to an output fiber. The attenuator comprises an attenuating device usually reflecting a portion of the incident beam and transmitting a portion of the incident beam as an output beam of the attenuator. The partly reflection of the incident beam generally leads to undesired back reflection and thus causes return loss. Tilting the attenuating device by a considerable angle generally leads to undesired polarization dependent loss and increasing the distances between attenuating element and emitting fiber disables building small instruments. A further effect resulting from back reflection might also be local heating due to absorption of the back reflected beam.

U.S. Pat. No. 5,546,212 discloses an optical module for two-way transmission. A semiconductor laser module is described in EP-A-595449. U.S. Pat. No. 6,137,941 shows a variable optical attenuator.

SUMMARY OF THE INVENTION

It is an object of the invention to provide an improved return loss of optical devices. The object is solved by the independent claims. Preferred embodiments are shown by the dependent claims.

According to the invention the emitted light beam of an emitting source is reflected at least partly by a partly-reflective element, which is tilted by a small angle to the optical axes of the input light beam for reflecting a portion of the emitted light beam towards a transmittive element in close proximity to the emitting source. Thus the return loss is reduced or eliminated and the polarization dependent loss is also optimized without increasing the size of the instrument. The invention allows a controlled guiding of the reflected portion of the emitted light beam in any desired direction and thus further allows a high power application.

In a preferred embodiment the partly-reflective element is tilted by a small angle to the optical axes of the input light beam so that the beam centroid of the reflected portion of the emitted light beam has a small lateral offset to the beam centroid of the emitted light beam and is directed to a transmittive element in close proximity to the emitting source, which is adapted to receive and transmit the reflected beam, so that substantially no portion of the received reflected portion is reflected towards the emitting source.

In a further preferred embodiment a mapping element is positioned between the partly reflective element and the transmittive element. The reflected portion of the emitted light beam is mapped in a controlled manner to the transmittive device causing a nearly complete transmission of the reflected portion away from the emitting source.

Advantageously by adjusting the tilt of the partly-reflective element the lateral offset can be determined. The tilt of the partly-reflective device is preferable limited for guiding the beam centroid of the reflected portion through the mapping element. The mapping element is preferably transmitting the reflected portion in opposite direction of the emitted input light beam.

Advantageously the mapping element comprises the collimating lens. This enables to collimate the emitted light beam transmitted by the partly-reflective element for coupling into an output fiber and also enables to map the reflected portion of the emitted light beam to the transmittive element.

In a further preferred embodiment the transmittive element is arranged for at least partly fixing or positioning an optical fiber, which is emitting the input light beam, and provided for transmitting the laterally offset reflected portion of the input light beam away from the input fiber.

The input light beam is according to a further preferred embodiment emitted by an optical fiber, which is at least partly fixed or positioned by a supporting device. This supporting device is provided for transmitting the thereto reflected portion of the input light beam with lateral offset from the focusing element. Thus, the supporting device transmits the reflected portion away from the fiber.

For transmitting away the reflected portion of the emitted light beam the transmittive element comprises in a preferred embodiment at least one optical fiber. This leads to a controlled transmission of the reflected portion away from the emitting source in any desired direction.

In a further preferred embodiment the transmittive element is housed in a ferrule element. The transmittive zone receiving the reflected portion is preferably positioned with lateral offset of the emitting source and enables to transmit all of the reflected portion.

In a further preferred embodiment the partly-reflective element is tilted in an angle smaller than 15° with respect to the emitted light beam for preferably guiding the reflected portion through the mapping element and to reduce absorption of the back reflected beam.

The partly reflecting device in any of the inventive embodiments can be, for example, an optical attenuator etc.

BRIEF DESCRIPTION OF THE DRAWINGS

Other objects and many of the attendant advantages of the present invention will be readily appreciated and become better understood by reference to the following detailed description when considered in connection with the accompanied drawings. Features that are substantially or functionally equal or similar will be referred to the same reference sign.

The invention shall now be illustrated with respect to preferred embodiments of an optical attenuator. However, it is clear that the principles of the invention can be applied to an optical device providing back reflection and is not limited to attenuating devices.

Figure 1:
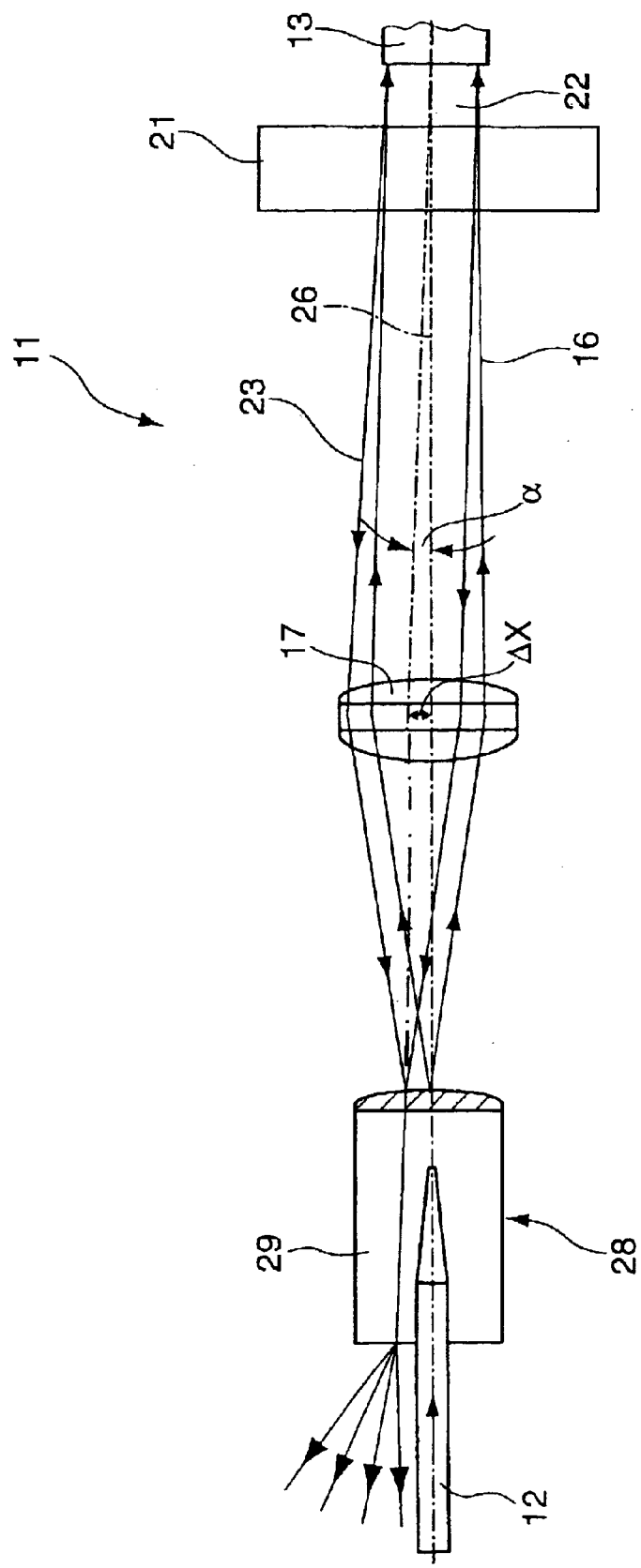
FIG. 1 shows a schematic view of a preferred embodiment of an optical attenuator according to the present invention and FIG. 2 shows a cross section view of an optical fiber and a diagram showing the mode of an input light beam and a reflected portion of the input light beam, laterally offset by an attenuating device.

In FIG. 1 an optical attenuator 11 is coupled between an emitting source 12 e.g. an input fiber and an output fiber 13. An input light beam 16 is emitted from the emitting source 12 and directed to a partly-reflective element 21, e.g. an attenuating device. This reflective element 21 is transmitting a portion 22 of the emitted light beam 16 to the output fiber 13 and is reflecting a portion 23 to a transmittive element 29 arranged in close proximity to the emitting source 12. To reduce the return loss the partly-reflective element 21 is tilted in a small angle with respect to the emitted light beam 16 and the transmittive element 29 is adapted to receive and transmit the reflected portion 23 away from the emitting source 12. Thus, back reflection causing interference is minimized or avoided and also the polarization dependent loss is reduced. No further influence to the emitted beam 16 is caused by the reflected portion 23.

FIG. 1 further shows a mapping element 17 positioned between the emitting source 12 and the partly reflective element 21. This mapping element 17 is preferred provided to map the reflected portion 23 to the transmittive element 29. The mapping element 17 comprises according to this embodiment according FIG. 1 a collimating lens or a system of lenses collimating the emitted light beam 16 and focusing the reflected portion 23 of the emitted light beam 16 towards the transmitting element 29.

The transmittive element 29 and the emitting source 12 as an input fiber are housed in a ferrule element 28 wherein the transmittive element 29 is preferably surrounding totally the optical source 12.

Alternatively the transmitting element 29 is provided as an optical fiber or plurality of optical fibers at least partly surrounding the emitting source 12 or at least in an adjacent position to the emitting source 12.

Figure 2:
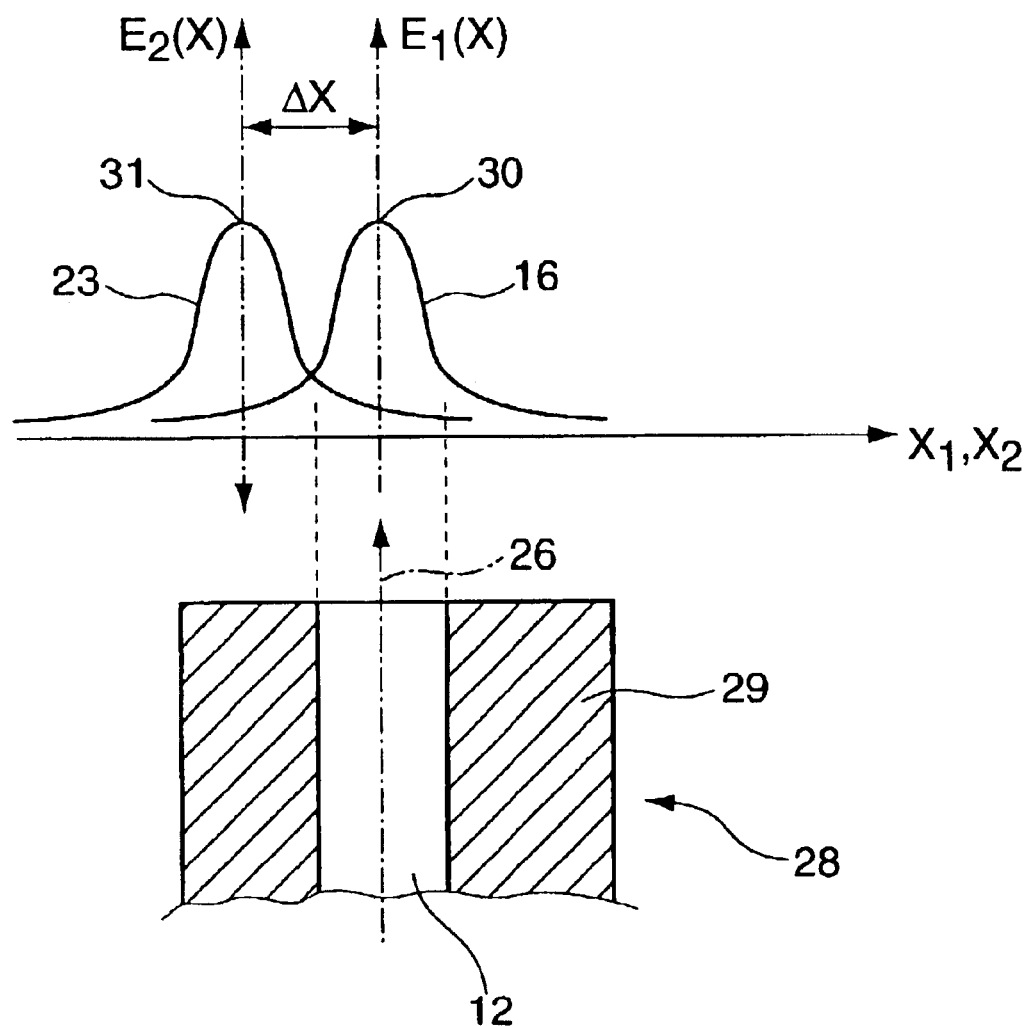

The reduction of return loss will be better understood with reference to FIG. 2.

An enlarged view of the ferrule element 28 comprising the emitting source 12 and the transmitting element 29 is shown in a sectional view. A first diagram positioned to an emitting point of the input fiber 12 shows the intensity $E_1(x)$ of the emitted input light beam 16 by the input fiber 12. For example is shown the fundamental mode $TEM_{00}$. The intensity $E_1(x)$ is for example conform to the Gaussian Distribution. The maximum of the intensity is conform to a beam centroid 30 of the input light beam 16. To avoid input coupling of the reflected portion 23 into the emitting source 12 after reflecting the input light beam 16 by the partly reflective element 21 a minimum distance as a lateral offset ($\Delta x$) is provided to the emitting point of the emitting source 12. This lateral offset ($\Delta x$) can be defined as $\Delta x=2f\alpha$. Thereby f represents the focal length of a lens and $\alpha$ represents the angle for tilting the partly reflecting element 21. The distance $\Delta x$ identifies a lateral offset of a beam centroid 31 of the reflected portion 23 with respect to beam centroid 30 of the emitted input light beam 16.

Back to FIG. 1 due to the lateral offset $\Delta x$ the focal point of the reflected portion 23 is positioned also with lateral offset $\Delta x$ to the emitting input light beam 16. The transmitting element 28 as shown in FIG. 1 is e.g. totally surrounding the input fiber 12 and is provided for transmitting the reflected portion 23 away from the focusing element 17. This transmittive element 29 enables to transmit the reflected portion 23 in close neighborhood away from the emitting source 12 without diminishing the intensity of the input light beam 16.

What is claimed is:

1. An optical device, comprising:
   an emitting source adapted to emit a light beam,
   a partly-reflective element adapted for receiving the emitted light beam, wherein the optical axis of the partly-reflective element is tilted in a small angle with respect to the emitted light beam, and the partly-reflective element reflects a portion of the emitted light beam, and
   a transmittive element is arranged in close proximity to the emitting source and adapted to receive and transmit the reflected portion,
   wherein the transmittive element is arranged for at least partly fixing or positioning an optical fiber, which is emitting the input light beam, and provided for transmitting a laterally offset reflected portion of the input light beam away from an input fiber.

2. The optical device of claim 1, wherein the transmittive element is provided that substantially no portion of the received reflected portion is reflected towards the partly-reflective element and subsequently towards the emitting source.

3. The optical device of claim 1, further comprising a mapping element arranged for mapping the reflected portion from the partly-reflective element towards the transmittive element, thus leading to a small lateral offset between the emitted light beam and the reflected light beam.

4. The optical device of claim 1, wherein the tilt of the partly-reflective element is adjustable for determining the lateral offset.

5. The optical device of claim 3, wherein the mapping element is adapted to collimate the light beam emitted from the emitting source.

6. The optical device of claim 3, wherein the mapping element comprises a collimating lens collimating the light beam emitted from the emitting source and focusing the reflected portion from the partly-reflective element towards the transmittive element.

7. The optical device of claim 1, wherein the transmittive element is arranged having a small lateral offset to the emitting source.

8. The optical device of claim 1, wherein the transmittive element comprises an optical fiber for transmitting the reflected portion.

9. The optical device of claim 1, further comprising a ferrule element housing the transmittive element and an optical fiber guiding the light beam to be emitted by the emitting source.

10. The optical device of claim 1, wherein the optical axis of the partly-reflective element is tilted in an angle smaller than 15° with respect to the emitted light beam.

11. The optical device of claim 1, wherein the partly-reflective element is an attenuating device for attenuating the optical power of the emitted light beam.

* * * * *